(12) United States Patent
Xi et al.

(10) Patent No.: US 10,690,788 B2
(45) Date of Patent: Jun. 23, 2020

(54) CHANNEL MULTIPLEXING METHOD FOR READING DETECTOR SIGNAL

(71) Applicant: RAYCAN TECHNOLOGY CO., LTD. (SU ZHOU), Suzhou, Jiangsu (CN)

(72) Inventors: Daoming Xi, Jiangsu (CN); Xiang Liu, Jiangsu (CN); Wei Liu, Jiangsu (CN); Chen Zeng, Jiangsu (CN); Qingguo Xie, Jiangsu (CN)

(73) Assignee: Raycan Technology Co., Ltd. (Suzhou), Suzhou, Jiangsu (CN)

( * ) Notice: Subject to any disclaimer, the term of this patent is extended or adjusted under 35 U.S.C. 154(b) by 539 days.

(21) Appl. No.: 15/541,906

(22) PCT Filed: Nov. 2, 2015

(86) PCT No.: PCT/CN2015/093577
§ 371 (c)(1),
(2) Date: Jul. 6, 2017

(87) PCT Pub. No.: WO2016/110149
PCT Pub. Date: Jul. 14, 2016

(65) Prior Publication Data
US 2018/0003831 A1 Jan. 4, 2018

(30) Foreign Application Priority Data
Jan. 7, 2015 (CN) .......................... 2015 1 0007564

(51) Int. Cl.
*G01T 1/16* (2006.01)
*G01T 1/29* (2006.01)
*G01T 1/164* (2006.01)
(52) U.S. Cl.
CPC ............ *G01T 1/2985* (2013.01); *G01T 1/164* (2013.01)

(58) Field of Classification Search
CPC ......... G01T 1/2985; G01T 1/164; H04L 5/00; H04L 5/02; H04J 3/00
See application file for complete search history.

(56) References Cited

U.S. PATENT DOCUMENTS 10,153,856 B2 * 12/2018 Xie ..................... G01T 1/161
2002/0115572 A1 8/2002 Mitsuda et al.
(Continued)

FOREIGN PATENT DOCUMENTS

CN 1971652 A 5/2007
CN 101453576 A 6/2009
(Continued)

OTHER PUBLICATIONS

JPO Notification of Reasons for Refusal corresponding to JP Application No. 2017-535981; dated Aug. 20, 2018.
P. Olcott et al., "Cross-Strip Multiplexed Electro-Optical Coupled Scintillation Detector for Integrated PET/MRI," IEEE Transactions of Nuclear Science; 2013, pp. 1-7.
(Continued)

*Primary Examiner* — Siu M Lee

(57) ABSTRACT

A channel multiplexing method for reading array detector signals includes: dividing array detectors into M groups, at least two detectors being in each group; array coding the read channel to read M row signals and N column signals, which means when a signal is outputted at the detector in row a, column b, the signals of row a and column b are outputted correspondingly; connecting the readout signals of the row and the column to different positions of two transmission lines respectively; determining the source row number and column number of the signal on the basis of the time difference between the time of signal reaching two ends of the transmission line, and marking the source detector from which the signal is generated on the basis of two time differences of the row signal and the column signal.

16 Claims, 3 Drawing Sheets

(56) References Cited

U.S. PATENT DOCUMENTS

| | | |
|---|---|---|
| 2005/0174015 A1 | 8/2005 | Scott |
| 2005/0242272 A1* | 11/2005 | Lawler .................... G01S 17/26 250/214 R |
| 2007/0114423 A1 | 5/2007 | Vester |
| 2008/0042070 A1 | 2/2008 | Levin |
| 2008/0251730 A1 | 10/2008 | Ballabriga et al. |
| 2009/0140155 A1 | 6/2009 | Yagi et al. |
| 2009/0271153 A1* | 10/2009 | Gebhardt ............... A61B 6/032 702/189 |
| 2011/0220802 A1* | 9/2011 | Frisch .................... G01T 1/208 250/363.03 |
| 2013/0077848 A1 | 3/2013 | Yamada et al. |
| 2013/0161527 A1 | 6/2013 | Lee et al. |
| 2013/0228697 A1 | 9/2013 | Soh et al. |
| 2014/0021354 A1 | 1/2014 | Gagnon et al. |
| 2014/0175294 A1* | 6/2014 | Frach .................... H04N 5/369 250/363.03 |
| 2015/0369930 A1 | 12/2015 | Mruthyunjaya et al. |

FOREIGN PATENT DOCUMENTS

| | | |
|---|---|---|
| CN | 102933983 A | 2/2013 |
| CN | 203965629 U | 11/2014 |
| JP | 2008514965 A | 5/2008 |
| JP | 2008527681 A | 7/2008 |
| JP | 2014021123 A | 2/2014 |
| JP | 2014529923 A | 11/2014 |
| WO | 2006050357 A2 | 5/2006 |
| WO | 2014143760 A1 | 9/2014 |

OTHER PUBLICATIONS

International Search Report for Corresponding Application No. PCT/CN2015/093577; dated, Feb. 3, 2016 with English Translation.

Extended European Search Report corresponding to Application No. 15876649.3-1219/3244234 PCT/CN2015093577; dated Jun. 28, 2018.

SIPO First Office Action corresponding to Application No. 201510007564.2; dated Apr. 26, 2018.

* cited by examiner

CHANNEL MULTIPLEXING METHOD FOR READING DETECTOR SIGNAL

This application is the U.S. national stage of application No. PCT/CN2015/093577, filed Nov. 2, 2015. Priority under 35 U.S.C. § 119(a) and 35 U.S.C. § 365(b) is claimed from Chinese Application No. 201510007564.2, filed Jan. 7, 2015, both of which are incorporated herein by reference in their entireties.

FIELD

The present disclosure relates to the field of nuclear detection technology and nuclear medicine imaging technology, and in particular to a channel multiplexing method for reading a detector signal.

BACKGROUND

In a clinical positron emission tomography (hereinafter referred to as PET) device, there are as many as thirty thousand pieces of detectors. Thirty thousand electronic processing channels are required to directly read electrical signals generated by every detector. And a large number of electronic channels will make the whole PET electronic system expensive and hard to realize.

For this case, researchers focus on the research and development of channel multiplexing technology for reading a detector signal. At present, the mainstream reading channel multiplexing method is: reading detector signals by arranging the detector signals in rows and columns and reading output signals after being weighted by a resistor network.

Multiplexing by using the resistor network can effectively decrease reading channels of a detector and solve the problem of overmuch channels. However, when applying the resistor network, equivalent resistances of the resistor network for different detectors are different due to the difference of signal access points, thus finally resulting in a big difference in output signal amplitudes of different detectors and a requirement of a higher dynamic range of a subsequent reading circuit. And the existing normal processing circuit has a finite dynamic range, the signal-to-noise ratio is poor when inputting a small signal, while the problem of saturation also appears when inputting an overlarge signal. So on account of the above technical problems, it is necessary to provide an improved channel multiplexing method for reading a detector signal to overcome the foregoing defects and effectively solve the problem of an overlarge dynamic range of output signals after multiplexing channels for detectors.

SUMMARY

In view of this, the objective of the present disclosure is to provide a channel multiplexing method for reading a detector signal which can decrease the use of electronic channels and can effectively solve the problem of an overlarge dynamic range of output signals after multiplexing channels for detectors.

In order to achieve the foregoing objective, the technical solutions provided in the present disclosure are as follows.

A channel multiplexing method for reading a detector signal incudes:

step S1: dividing L detector signals into M groups, where the number of detectors in each group is greater than or equal to two and less than or equal to N, the number of the detector signals in an a-th group is P(a), and $$L = \sum_{a=1}^{M} P(a),$$

a b-th detector signal in the a-th group is marked as Signal(a,b), and M≥2, N≥2, 1≤a≤M, 1≤b≤N;

step S2: dividing an output signal of each of the detectors in step S1 into a row source signal and a column source signal, adding together row source signals of the detectors in the a-th group to form a row signal, and to finally form M row signals for the M groups, adding together the column source signal of a b-th detector in each of the M groups to form a column signal, and to finally form N column signals;

step S3: providing a row signal transmission line including two signal nodes being a signal node A and a signal node B, connecting the M row signals in step S2 to different positions between the signal node A and the signal node B on the row signal transmission line, marking a difference between a distance from an a-th row signal to the node A and a distance from the a-th row signal to the node B on the row signal transmission line as D_rowx(a), and controlling a value of D_rowx to make values of D_rowx corresponding to any row signals different;

step S4: providing a column signal transmission line including two signal nodes being a signal node C and a signal node D, connecting the N column signals in step S2 to different positions between the signal node C and the signal node D on the column signal transmission line, marking a difference between a distance from a b-th column signal to the node C and a distance from the b-th column signal to the node D on the column signal transmission line as D_rowy(b), and controlling a value of D_rowy to make values of D_rowy corresponding to any column signals different; and step S5: marking a source detector generating the signal and acquiring final pulse information based on pulses of four nodes being the node A, the node B, the node C and the node D.

In the above channel multiplexing method for reading a detector signal, preferably, in the S1, the number of the detectors in each of the M groups is N, and M×N=L, M≥2, N≥2.

In the above channel multiplexing method for reading a detector signal, preferably, in the S2, output nodes of the row source signals of the detectors in each row are connected directly to form an output node of the row signal for the row, and output nodes of the column source signals of the detectors in each column are connected directly to form an output node of the column signal for the column.

In the above channel multiplexing method for reading a detector signal, preferably, in the S2, the row signal and the column signal are acquired by an adding circuit.

In the above channel multiplexing method for reading a detector signal, preferably, in the S5, an output signal of any one of the four nodes being the node A, the node B, the node C and the node D is served as an output pulse of a detector for use in analysis and processing by a subsequent circuit.

In the above channel multiplexing method for reading a detector signal, preferably, in the S5, out signals of at least two of the four nodes being the node A, the node B, the node C and the node D are added together to form an added signal, and the added signal is served as an output pulse of a detector for use in analysis and processing by a subsequent circuit.

In the above channel multiplexing method for reading a detector signal, preferably, in the S5, output signals of the four nodes being the node A, the node B, the node C and the node D are used in analysis and processing by a subsequent circuit to acquire four groups of pulse information respectively, and the final pulse information is acquired based on the four groups of pulse information.

In the above channel multiplexing method for reading a detector signal, preferably, a mean of the acquired four groups of pulse information is taken as the final pulse information.

In the above channel multiplexing method for reading a detector signal, preferably, the final pulse information is acquired based on the four groups of pulse information by using a likelihood estimation method.

In the above channel multiplexing method for reading a detector signal, preferably, in the S5, time during which a signal reaches each of the four nodes being the node A, the node B, the node C and the node D is measured, a time difference between the time during which the signal reaches the node A and the time during which the signal reaches the node B is calculated, a time difference between the time during which the signal reaches the node C and the time during which the signal reaches the node D is calculated, a source row number and a source column number of the signal are determined based on the time differences, and the source detector generating the signal is marked based on the two time differences.

In the above channel multiplexing method for reading a detector signal, preferably, in the S5, a differential pulse between a pulse of the node A and a pulse of the node B and a differential pulse between a pulse of the node C and a pulse of the node D are acquired by using a subtracting circuit, a pulse width of the differential pulse between the pulse of the node A and the pulse of the node B represents the time difference between the time during which the signal reaches the node A and the time during which the signal reaches the node B, and a pulse width of the differential pulse between the pulse of the node C and the pulse of the node D represents the time difference between the time during which the signal reaches the node C and the time during which the signal reaches the node D.

In the above channel multiplexing method for reading a detector signal, preferably, in the S5, a differential pulse between a pulse of the node A and a pulse of the node B and a differential pulse between a pulse of the node C and a pulse of the node D are acquired by using a subtracting circuit, an amplitude of the differential pulse between the pulse of the node A and the pulse of the node B represents the time difference between the time during which the signal reaches the node A and the time during which the signal reaches the node B, and an amplitude of the differential pulse between the pulse of the node C and the pulse of the node D represents the time difference between the time during which the signal reaches the node C and the time during which the signal reaches the node D.

In the above channel multiplexing method for reading a detector signal, preferably, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on a circuit structure and dividing lines between adjacent detectors on g(x, y) are calculated based on the circuit structure to distinguish distribution regions of different detectors on g(x, y).

In the above channel multiplexing method for reading a detector signal, preferably, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on the probability distribution function g(x, y) and dividing lines between adjacent detectors on g(x, y) are calculated based on the probability distribution function g(x, y) to distinguish distribution regions of different detectors on g(x, y).

In the above channel multiplexing method for reading a detector signal, preferably, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on a circuit structure, and a certain region around the position of the detector is served as a distribution region of the detector on g(x, y).

In the above channel multiplexing method for reading a detector signal, preferably, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on the probability distribution function g(x, y), and a certain region around the position of the detector is served as a distribution region of the detector on g(x, y).

Compared with the conventional art, the above technical solutions have the following advantages.

1. A channel multiplexing method for reading a detector signal includes: step S1: dividing L detector signals into M groups, where the number of detectors in each group is greater than or equal to two and less than or equal to N, the number of the detector signals in an a-th group is P(a), and $$L = \sum_{a=1}^{M} P(a),$$

a b-th detector signal in the a-th group is marked as Signal(a,b), and M≥2, N≥2, 1≤a≤M, 1≤b≤N; step S2: dividing an output signal of each of the detectors in step S1 into a row source signal and a column source signal, adding together row source signals of the detectors in the a-th group to form a row signal, and to finally form M row signals for the M groups, adding together the column source signal of a b-th detector in each of the M groups to form a column signal, and to finally form N column signals; step S3: providing a row signal transmission line including two signal nodes being a signal node A and a signal node B, connecting the M row signals in step S2 to different positions between the signal node A and the signal node B on the row signal transmission line, marking a difference between a distance from an a-th row signal to the node A and a distance from the a-th row signal to the node B on the row signal transmission line as D_rowx(a), and controlling a value of D_rowx to make values of D_rowx corresponding to any row signals different; step S4: providing a column signal transmission line including two signal nodes being a signal node C and a signal node D, connecting the N column signals in step S2 to different positions between the signal node C and the signal node D on the column signal transmission line, marking a difference between a distance from a b-th column signal to the node C and a distance from the b-th column signal to the node D on the column signal transmission line as D_rowy(b), and controlling a value of D_rowy to make values of D_rowy corresponding to any column signals different; and step S5: marking a source detector generating the signal and acquiring final pulse information based on pulses of four nodes being the node A, the node B, the node C and the node D. In the present disclosure, it is avoided the use of multiple electronic channels, and thereby reducing the cost of the whole PET electronic system and technical difficulty of implementation. In addition, the use of the weighted resistor network is avoided in the channel multiplexing process, so that the amplitude of the multiplexed signal does not change greatly for different signal connecting points and the requirement of the dynamic range of the subsequent reading circuit is lowered.

2. In the S1, the number of the detectors in each of the M groups is N, and M×N=L, M≥2, N≥2. In this technical solution, the number of detectors in each row may be the same or different, which has no influence on the implementation of this method, and specific implementations are determined by practical applications.

3. In the S2, output nodes of the row source signals of the detectors in each row are connected directly to form an output node of the row signal for the row, and output nodes of the column source signals of the detectors in each column are connected directly to form an output node of the column signal for the column. In this technical solution, in a case that some detector, such as a SiPM, is applied, the row signal and the column signal may be acquired by a way of succinct direct connection, thereby improving the integration level of a detector array and making the detectors more compact.

4. In the S2, the row signal and the column signal are acquired by an adding circuit. In this technical solution, if some detector devices which are not convenient to connect directly are applied, an adding circuit may be used to acquire the row signal and the column signal, and the method is less affected by the type and distribution parameter of the detector.

5. In the S5, an output signal of any one of the four nodes being the node A, the node B, the node C and the node D is served as an output pulse of a detector for use in analysis and processing by a subsequent circuit. In this technical solution, in a case that any one detector in a detector array detects a signal, all the four nodes have corresponding output which reflecting the detector information, and by using information of only one of the channels to represent the detector, the complexity of a subsequent reading circuit is decreased.

6. In the S5, out signals of at least two of the four nodes being the node A, the node B, the node C and the node D are added together to form an added signal, and the added signal is served as an output pulse of a detector for use in analysis and processing by a subsequent circuit. In this technical solution, in a case that any one detector in a detector array detects a signal, all the four nodes have corresponding output including the detector information, and by adding together signals of multiple channels, the reading performance of a detector is increased.

7. In the S5, output signals of the four nodes being the node A, the node B, the node C and the node D are used in analysis and processing by a subsequent circuit to acquire four groups of pulse information respectively, and the final pulse information is acquired based on the four groups of pulse information. In this technical solution, in a case that any one detector in a detector array detects a signal, all the four nodes have corresponding output including the detector information. If a subsequent reading circuit meets a condition, signals of the four nodes may be all processed, and an original detector is acquired based on the obtained four groups of pulse information; thus the four groups of pulse information are all reflected in the acquired detector pulse information, and the performance of the detector is improved.

8. A mean of the acquired four groups of pulse information is taken as the final pulse information. In this technical solution, the performance of taking a mean of the four groups of pulse information is superior to the performance of using one of the four groups of pulse information.

9. The final pulse information is acquired based on the four groups of pulse information by using a likelihood estimation method. In this technical solution, when calculating detector pulse information by using the four groups of pulse information, there is an optimal proportion of each group of pulses to make the acquired pulse information have the best performance. On the basis of existing data, the optimal proportion may be acquired according to the current system performance evaluation criteria; and the optimal proportion may be used to realize better performance when collecting pulses afterwards.

10. In the S5, time during which a signal reaches each of the four nodes being the node A, the node B, the node C and the node D is measured, a time difference between the time during which the signal reaches the node A and the time during which the signal reaches the node B is calculated, a time difference between the time during which the signal reaches the node C and the time during which the signal reaches the node D is calculated, a source row number and a source column number of the signal are determined based on the time differences, and the source detector generating the signal is marked based on the two time differences. In this technical solution, there are many ways of calculating a time difference. In a case that the four groups of pulse information are digitalized firstly, the time difference may be calculated based on the time during which the signal reaches each of the four nodes, and the interference by a subsequent analog circuit may be decreased by performing the pulse digitalization as early as possible.

11. In the S5, a differential pulse between a pulse of the node A and a pulse of the node B and a differential pulse between a pulse of the node C and a pulse of the node D are acquired by using a subtracting circuit, a pulse width of the differential pulse between the pulse of the node A and the pulse of the node B represents the time difference between the time during which the signal reaches the node A and the time during which the signal reaches the node B, and a pulse width of the differential pulse between the pulse of the node C and the pulse of the node D represents the time difference between the time during which the signal reaches the node C and the time during which the signal reaches the node D. In this technical solution, a pulse width of the differential pulse may represent the time difference. In a case that same pulses has a certain phase difference, a width of the differential pulse may represent the phase difference; and the number of channels of a subsequent reading circuit can be decreased by this method.

12. In the S5, a differential pulse between a pulse of the node A and a pulse of the node B and a differential pulse between a pulse of the node C and a pulse of the node D are acquired by using a subtracting circuit, an amplitude of the differential pulse between the pulse of the node A and the pulse of the node B represents the time difference between the time during which the signal reaches the node A and the time during which the signal reaches the node B, and an amplitude of the differential pulse between the pulse of the node C and the pulse of the node D represents the time difference between the time during which the signal reaches the node C and the time during which the signal reaches the node D. In this technical solution, in a case that a pulse phase and the time of the rising edge are suitable, amplitude of the differential pulse may represent a time difference, and the time measurement may be replaced by a way of peak detection to decrease the complexity of circuits.

13. In the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on a circuit structure and dividing lines between adjacent detectors on g(x, y) are calculated based on the circuit structure to distinguish distribution regions of different detectors on g(x, y). In this technical solution, the position of a detector on a probability density function is calculated by using a parameter of the circuit structure; thereby decreasing the difficulty of debugging and improving the productivity in mass production 14. In the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on the probability distribution function g(x, y) and dividing lines between adjacent detectors on g(x, y) are calculated based on the probability distribution function g(x, y) to distinguish distribution regions of different detectors on g(x, y). In this technical solution, dividing lines between positions of different detectors are used to distinguish distribution regions of the detectors on the probability density function, thereby the detection efficiency of the system is improved and a position may be allocated for each event.

15. In the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on a circuit structure, and a certain region around the position of the detector is served as a distribution region of the detector on g(x, y). In this technical solution, a certain region around the position of the detector is served as a distribution region of the detector on the probability density function; thereby the event which is liable to be distinguished wrongly can be removed and the signal-to-noise ratio is improved.

16. In the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on the probability distribution function g(x,y), and a certain region around the position of the detector is served as a distribution region of the detector on g(x, y). In this technical solution, the probability density function is acquired on the basis of existing data; thereby various distribution parameters in a detector array can be reflected, and the acquired position is more accurate and more suitable for the array.

DETAILED DESCRIPTION OF THE EMBODIMENTS

Disclosed in the present disclosure is a channel multiplexing method for reading a detector signal which can effectively solve the problem of an overlarge dynamic range of output signals after multiplexing channels for detectors.

Figure 4:
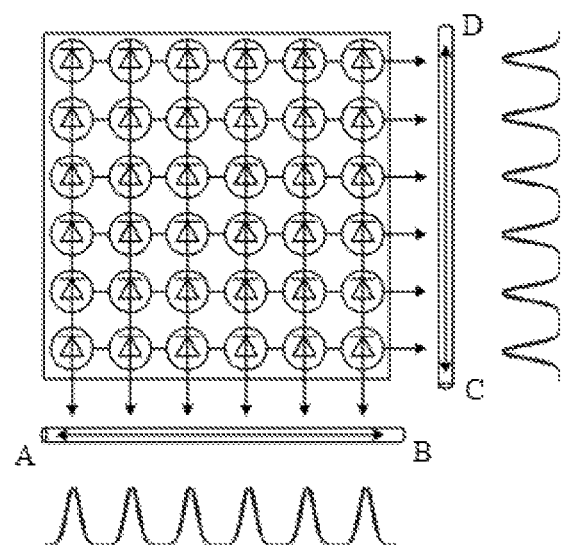
FIG. 4 is a diagram illustrating the implementation of a channel multiplexing method for reading a detector signal according to the present disclosure.
Figure 5:
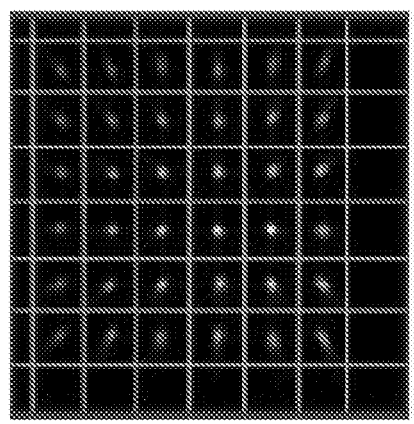
FIG. 5 is a diagram illustrating divided distribution regions after detector signals are read in a channel multiplexing method for reading a detector signal according to the present disclosure.

As shown in FIGS. 4 to 5, a channel multiplexing method for reading a detector signal according to the present disclosure includes the following steps S1 to S5.

In step S1, L detector signals are divided into M groups, where the number of detectors in each group is greater than or equal to two and less than or equal to N, the number of the detector signals in an a-th group is P(a), and $$L = \sum_{a=1}^{M} P(a),$$

a b-th detector signal in the a-th group is marked as Signal(a,b), and M≥2, N≥2, 1≤a≤M, 1≤b≤N.

In step S2, an output signal of each of the detectors in step S1 is divided into a row source signal and a column source signal, row source signals of the detectors in the a-th group are added together to form a row signal, and to finally form M row signals for the M groups, the column source signal of a b-th detector in each of the M groups are added together to form a column signal, and to finally form N column signals.

In step S3, a row signal transmission line including two signal nodes being a signal node A and a signal node B is provided, the M row signals in step S2 are connected to different positions between the signal node A and the signal node B on the row signal transmission line, a difference between a distance from an a-th row signal to the node A and a distance from the a-th row signal to the node B on the row signal transmission line is marked as D_rowx(a), and a value of D_rowx is controlled to make values of D_rowx corresponding to any row signals different.

In step S4, a column signal transmission line including two signal nodes being a signal node C and a signal node D is provided, the N column signals in step S2 are connected to different positions between the signal node C and the signal node D on the column signal transmission line, a difference between a distance from a b-th column signal to the node C and a distance from the b-th column signal to the node D on the column signal transmission line is marked as D_rowy(b), and a value of D_rowy is controlled to make values of D_rowy corresponding to any column signals different.

In step S5, a source detector generating the signal is marked and final pulses information is acquired based on pulses of four nodes being the node A, the node B, the node C and the node D.

In the present disclosure, it is avoided the use of multiple electronic channels, and thereby reducing the cost of the whole PET electronic system and technical difficulty of implementation. In addition, the use of the weighted resistor network is avoided in the channel multiplexing process, so that the amplitude of the multiplexed signal does not change greatly for different signal connecting points and the requirement of the dynamic range of the subsequent reading circuit is lowered.

In the S1, the number of the detectors in each of the M groups may be unequal, and also may be equal certainly. If the number of the detectors in each of the M groups is equal, for example, if the number is N, where M×N=L, M≥2, N≥2. The number of the detectors in each row may be equal or unequal, which has no influence on the realization of this method; and specific implementations are determined by practical applications.

In the step S2, there are multiple methods to add together the row signals and column signals. For example, output nodes of the row source signals of the detectors in each row may be connected directly to form an output node of the row signal for the row, and output nodes of the column source signals of the detectors in each column may be connected directly to form an output node of the column signal for the column. Alternatively, the row signal and the column signal may be acquired by an adding circuit. In a case that some detector, such as a SiPM, is applied, the row signal and the column signal may be acquired by a way of succinct direct connection, thereby improving the integration level of a detector array and making the detectors more compact. If some detector devices which are not convenient to connect directly are applied, an adding circuit may be used to acquire the row signal and the column signal, and the method is less affected by the type and distribution parameter of the detector.

Specifically, taking a detector being Silicon photo-multiple (hereinafter referred to as SiPM) as an example, signals may be read simultaneously from two channels of a SiPM, that is anode and cathode respectively. When SiPM are arranged in rows and columns, a signal may be read from the cathode and anode of the SiPM respectively to constitute two signals for the use of row adding and column adding afterwards. The cathodes (or anodes) of all detectors in each row may be connected directly to form a row added signal, and correspondingly, the anodes (or cathodes) of all detectors in each column may be connected directly to form a column added signal. Or an adding circuit is used to process cathodes (or anodes) of all detectors to form a row added signal, and correspondingly, an adding circuit is used to process anodes (or cathodes) of all detectors to form a column added signal.

An output signal of any one of the four nodes being the node A, the node B, the node C and the node D may be served as an output pulse of a detector for use in analysis and processing by a subsequent circuit. In a case that any one detector in a detector array detects a signal, all the four nodes have corresponding output which reflecting the detector information, and by using information of only one of the channels to represent the detector, the complexity of a subsequent reading circuit is decreased.

Certainly, out signals of at least two of the four nodes being the node A, the node B, the node C and the node D may be added together to form an added signal, and the added signal is served as an output pulse of a detector for use in analysis and processing by a subsequent circuit. For example, two nodes or three nodes are selected. In a case that any one detector in a detector array detects a signal, all the four nodes have corresponding output including the detector information, and by adding together signals of multiple channels, the reading performance of a detector is increased.

Certainly, output signals of the four nodes being the node A, the node B, the node C and the node D may be used in analysis and processing by a subsequent circuit to acquire four groups of pulse information respectively, and the final pulse information may be acquired based on the four groups of pulse information. In the current method, a mean of the acquired four groups of pulse information is taken as the final pulse information. The performance of taking a mean of the four groups of pulse information is superior to the performance of using one of the four groups of pulse information. If the four groups of pulse information is A, B, C and D respectively, then the final pulse information is $I=(A+B+C+D)/4$. Alternatively, the final pulse information is acquired by using a likelihood estimation method. When calculating detector pulse information by using the four groups of pulse information, there is an optimal proportion of each group of pulses to make the acquired pulse information have the best performance. On the basis of existing data, the optimal proportion may be acquired according to the current system performance evaluation criteria; and the optimal proportion may be used to realize better performance when collecting pulses afterwards. Firstly it is assumed that the relationship between the final pulse information and every pulse information is $I=a·A+b·B+c·C+d·D$ or other forms; by collecting multiple groups of experiments, the optimum value of a, b, c and d are found to make the final pulse information I have the best performance, and this group of the optimum value of a, b, c and d will be used in the following collecting process. In a case that any one detector in a detector array detects a signal, all the four nodes have corresponding output including the detector information. If a subsequent reading circuit meets a condition, signals of the four nodes may be all processed, and an original detector is acquired based on the obtained four groups of pulse information; thus the four groups of pulse information are all reflected in the acquired detector pulse information, and the performance of the detector is improved.

The implementation method of the S5 is as follows. Time during which a signal reaches each of the four nodes being the node A, the node B, the node C and the node D is measured, a time difference between the time during which the signal reaches the node A and the time during which the signal reaches the node B is calculated, a time difference between the time during which the signal reaches the node C and the time during which the signal reaches the node D is calculated, a source row number and a source column number of the signal are determined based on the time differences, and the source detector generating the signal is marked based on the two time differences. There are many ways of calculating a time difference. In a case that the four groups of pulse information are digitalized firstly, the time difference may be calculated based on the time during which the signal reaches each of the four nodes, and the interference by a subsequent analog circuit may be decreased by performing the pulse digitalization as early as possible.

The methods for acquiring the time difference include but not limited to the following two methods.

In a first method, a differential pulse between a pulse of the node A and a pulse of the node B and a differential pulse between a pulse of the node C and a pulse of the node D are acquired by using a subtracting circuit, a pulse width of the differential pulse between the pulse of the node A and the pulse of the node B represents the time difference between the time during which the signal reaches the node A and the time during which the signal reaches the node B, and a pulse width of the differential pulse between the pulse of the node C and the pulse of the node D represents the time difference between the time during which the signal reaches the node C and the time during which the signal reaches the node D. A pulse width of the differential pulse may represent the time difference. In a case that same pulses has a certain phase difference, a width of the differential pulse may represent the phase difference; and the number of channels of a subsequent reading circuit can be decreased by this method.

In a second method, in the S5, a differential pulse between a pulse of the node A and a pulse of the node B and a differential pulse between a pulse of the node C and a pulse of the node D are acquired by using a subtracting circuit, an amplitude of the differential pulse between the pulse of the node A and the pulse of the node B represents the time difference between the time during which the signal reaches the node A and the time during which the signal reaches the node B, and an amplitude of the differential pulse between the pulse of the node C and the pulse of the node D represents the time difference between the time during which the signal reaches the node C and the time during which the signal reaches the node D. In a case that a pulse phase and the time of the rising edge are suitable, amplitude of the differential pulse may represent a time difference, and the time measurement may be replaced by a way of peak detection to decrease the complexity of circuits.

The above step of determining a source row number and a source column number of the signal based on the time differences and marking the source detector generating the signal based on the two time differences includes the following four methods.

In a first method, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on the probability distribution function g(x, y) and dividing lines between adjacent detectors on g(x, y) are calculated based on the probability distribution function g(x, y) to distinguish distribution regions of different detectors on g(x, y). The probability density function is considered as a reference for the subsequent identification of a position of the detector. The position of a detector may be calculated from the probability density function, which is "identified" from the probability density function in a certain calculation method (for example, the white patch and the part surrounding the white patch allocated to the white patch on the location spectrum, that is the part within the box is considered as the corresponding position of a detector). When a pulse is detected afterwards, by comparing the obtained value of (x, y) with the obtained probability density diagram, the pulse may be represented or distinguished that which detector it comes from. Dividing lines between positions of different detectors are used to distinguish distribution regions of the detectors on the probability density function, thereby the detection efficiency of the system is improved and a position may be allocated for each event.

In a second method, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on a circuit structure and dividing lines between adjacent detectors on g(x, y) are calculated based on the circuit structure to distinguish distribution regions of different detectors on g(x, y). When there is a pulse signal coming from any one detector in a detector array, a pulse signal may be detected at the four nodes, and two time differences x and y may be calculated. The probability density function may be used to identify positions of a detector, and correspondingly, the value of (x, y) corresponding to some detector in an array may also be obtained according to a circuit structure. When a pulse is propagating on a transmission line, the propagation velocity may be calculated or measured and may remain stable. So the time difference value (x, y) may be calculated by the distance of from a detector to two nodes on a transmission line. This value may also be used as a basis of acquiring a detector position corresponding to the pulse when collecting data afterwards. The position information calibration of a detector may be calculated by a circuit structure. The position of a detector on a probability density function is calculated by using a parameter of the circuit structure; thereby decreasing the difficulty of debugging and improving the productivity in mass production.

In a third method, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on a circuit structure, and a certain region around the position of the detector is served as a distribution region of the detector on g(x, y). A certain region around the position of the detector is served as a distribution region of the detector on the probability density function; thereby the event which is liable to be distinguished wrongly can be removed and the signal-to-noise ratio is improved.

In a fourth method, in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on the probability distribution function g(x, y), and a certain region around the position of the detector is served as a distribution region of the detector on g(x, y). The probability density function is acquired on the basis of existing data; thereby various distribution parameters in a detector array can be reflected, and the acquired position is more accurate and more suitable for the array.

The "certain region" in the third method and the fourth method is defined by the following two manners.

In a first manner, on a probability density function, considering a determined detector position as a centre, and choosing a circle with a radius of R as the "certain region". The regions corresponding to two adjacent detectors do not overlap. For the determination of R, by two-dimensional Gaussian surface fitting of the patches corresponding to the detector, the corresponding radium when the function value is half of the maximum is considered as R; and there are other ways to determine the value of R, and specific values is defined reasonably according to practical applications.

In a second manner, on a probability density function, choosing a region where the patch corresponding to the detector position is bigger than a certain value (for example, the ⅓ of the maximum value) as the "certain region". And the specific value is defined reasonably according to practical applications.

If the above first and second methods are used, that is, positions corresponding to different detectors are distinguished by dividing lines; all information collected afterwards will be allocated to a detector belong to oneself, that is, a position of oneself. In these two methods, the sensitivity of a detector is much higher. That is, all pulses detected are not wasted.

In the multiplexing method, if a detected time difference of a new pulse has a high matching degree with multiple points in the calibrated position information (x, y), and which point is the best matched is difficult to determine; pulse information near a dividing line for example, if it is distinguished to a detector, then the possibility of mistaken for the pulse information is greater than pulse information in a center of the box. Then in the third and the fourth method, that is, in the step of "a certain region around the position of the detector is served as a distribution region of the detector on g(x, y)", this part of pulses which are very easily to be distinguished with wrong positions are directly discarded, thereby decreasing a mistake of position information.

The probability distribution function g(x, y) is not obtained directly but by a process of statistical calculation. Firstly, a certain number of data need to be collected; if 10,000 pulses are detected, then 10,000 (x, y) will be obtained, and the probability of the 10,000 (x, y) to a precise extent of requirement needs to be counted, or the number therefor. For example, if the number of the difference in some (x, y) is 100 and in another (x, y) is 50, a statistic three-dimensional diagram is a probability density function. That is, by collecting a number of data, the probability density function is obtained, and thus the position information calibration of a detector is acquired.

The detector may be a SiPM or a photodiode or some other detector with only one channel to output. For the detector with only one channel to output, for example a photomultiplier (PMT), the one output signal may be divided to two signals by an analog circuit, which are considered as a row signal and a column signal in the present disclosure.

Compared with the existing two multiplexing methods, the present method has apparent advantages.

Now SiPM is taken as an example to describe the method provided in the present disclosure deeply.

Figure 1:
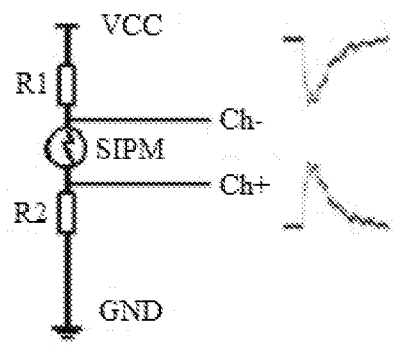
FIG. 1 is a diagram illustrating a reading circuit of a silicon photo-multiple in a channel multiplexing method for reading a detector signal according to the present disclosure.

As shown in FIG. 1, taking a SiPM as an example, signals read from a channel CH− and a channel CH+ in FIG. 1 are independent, and amplitudes of the signals are opposite while the carried information is the same.

Figure 2:
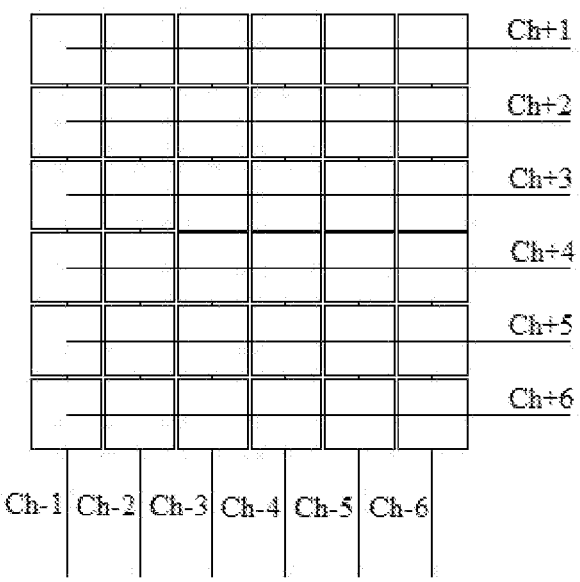
FIG. 2 is a diagram illustrating an area array detector including 36 SiPMs arranged in a 6×6 manner in a channel multiplexing method for reading a detector signal according to the present disclosure.

By utilizing the two independent signal channels, an area array detector including SiPM directly connect the signals in a same row and the signals in a same column. Referring to FIG. 2, an area array detector including 36 SiPMs in the arrangement of a 6×6 manner is shown in FIG. 2. The SiPM area array connects the signals read from the two channels in a same row and the signals in a same column. Then the number of reading channels of the area array detector decreases from the original 36 to the current 12, that is, 6 row reading channels and 6 column reading channels. By rows and columns coding, not only a signal of a SiPM pulse can be read, but also the SiPM generating the pulse can be identified.

Since it takes some time when a signal transfers in a wire, and if two wires with different lengths are used to conduct a signal to signal reading ends respectively, then the time during which the signal reaches the signal reading ends are different. According to this theory, multiple signals may be connected to different positions on a transmission line, and an input channel of a signal may be determined by using the time difference between the time during which the signal reaches two ends of the transmission line. By utilizing the theory, a signal may be read in a time division multiplexing manner.

Figure 3:
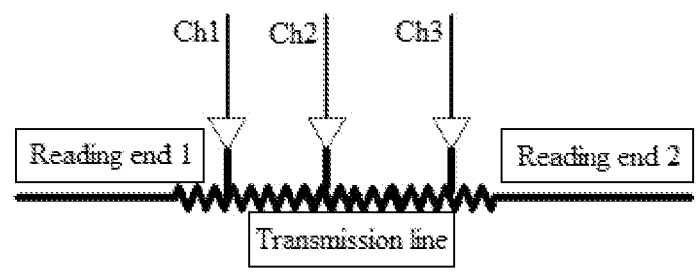
FIG. 3 is a diagram illustrating multiple signal access points arranged on a transmission line in a channel multiplexing method for reading a detector signal according to the present disclosure.

Referring to FIG. 3, Ch2 is connected to a center position of a transmission line, and Ch1 is connected to the left side of the transmission line while Ch3 is connected to the right side of the transmission line. When the time difference between the time during which the signal is read by two ends of the transmission line, that is, a reading end 1 and a reading end 2, is 0, it indicates that the signal is from channel Ch2; when the time difference is greater than 0, it indicates that the signal is from channel Ch3; and when the time difference is less than 0, it indicates that the signal is from channel Ch1. If there are more than three channels connecting to the transmission line, a source channel of a signal may be distinguished by the distinction of the time difference.

In conjunction with FIG. 2 and FIG. 3, it can be known that, reading channels of arranged detectors are converted to reading rows and reading columns by utilizing the rows and columns coding in the present disclosure. Signals read from the row and the column are connected to different positions on a transmission line, and a source row number and a source column number of the signal can be determined by using the time difference between the time during which the signal is read by two ends of the transmission line.

The channel multiplexing method for reading a detector signal provided in the present disclosure effectively solve the problem of overmuch detector reading channels. In addition, the use of the weighted resistor network is avoided in the channel multiplexing process, so that the amplitude of the multiplexed signal does not change greatly for different signal connecting points and the requirement of the dynamic range of the subsequent reading circuit is lowered.

The invention claimed is:

1. A channel multiplexing method for reading a detector signal, comprising:
   step S1: dividing L detector signals into M groups, wherein the number of detectors in each group is greater than or equal to two and less than or equal to N, the number of the detector signals in an a-th group is P(a), and $$L = \sum_{a=1}^{M} P(a),$$

a b-th detector signal in the a-th group is marked as Signal(a,b), and M≥2, N≥2, 1≤a≤M, 1≤b≤N;
   step S2: dividing an output signal of each of the detectors in step S1 into a row source signal and a column source signal, adding together row source signals of the detectors in the a-th group to form a row signal, and to finally form M row signals for the M groups, adding together the column source signal of a b-th detector in each of the M groups to form a column signal, and to finally form N column signals;
   step S3: providing a row signal transmission line comprising two signal nodes being a signal node A and a signal node B, connecting the M row signals in step S2 to different positions between the signal node A and the signal node B on the row signal transmission line, marking a difference between a distance from an a-th row signal to the node A and a distance from the a-th row signal to the node B on the row signal transmission line as D_rowx(a), and controlling a value of D_rowx to make values of D_rowx corresponding to any row signals different;
   step S4: providing a column signal transmission line comprising two signal nodes being a signal node C and a signal node D, connecting the N column signals in step S2 to different positions between the signal node C and the signal node D on the column signal transmission line, marking a difference between a distance from a b-th column signal to the node C and a distance from the b-th column signal to the node D on the column signal transmission line as D_rowy(b), and controlling a value of D_rowy to make values of D_rowy corresponding to any column signals different; and
   step S5: marking a source detector generating a signal and acquiring final pulse information based on pulses of four nodes being the node A, the node B, the node C and the node D.

2. The channel multiplexing method for reading a detector signal according to claim 1, wherein in the S1, the number of the detectors in each of the M groups is N, and M×N=L, M≥2, N≥2.

3. The channel multiplexing method for reading a detector signal according to claim 1, wherein in the S2, output nodes of the row source signals of the detectors in each row are connected directly to form an output node of the row signal for the row, and output nodes of the column source signals of the detectors in each column are connected directly to form an output node of the column signal for the column.

4. The channel multiplexing method for reading a detector signal according to claim 1, wherein in the S2, the row signal and the column signal are acquired by an adding circuit.

5. The channel multiplexing method for reading a detector signal according to claim 1, wherein in the S5, an output signal of any one of the four nodes being the node A, the node B, the node C and the node D is served as an output pulse of a detector for use in analysis and processing by a subsequent circuit.

6. The channel multiplexing method for reading a detector signal according to claim 1, wherein in the S5, out signals of at least two of the four nodes being the node A, the node B, the node C and the node D are added together to form an added signal, and the added signal is served as an output pulse of a detector for use in analysis and processing by a subsequent circuit.

7. The channel multiplexing method for reading a detector signal according to claim 1, wherein in the S5, output signals of the four nodes being the node A, the node B, the node C and the node D are used in analysis and processing by a subsequent circuit to acquire four groups of pulse information respectively, and the final pulse information is acquired based on the four groups of pulse information.

8. The channel multiplexing method for reading a detector signal according to claim 7, wherein a mean of the acquired four groups of pulse information is taken as the final pulse information.

9. The channel multiplexing method for reading a detector signal according to claim 7, wherein the final pulse information is acquired based on the four groups of pulse information by using a likelihood estimation method.

10. The channel multiplexing method for reading a detector signal according to claim 1, wherein in the S5, time during which a signal reaches each of the four nodes being the node A, the node B, the node C and the node D is measured, a time difference between the time during which the signal reaches the node A and the time during which the signal reaches the node B is calculated, a time difference between the time during which the signal reaches the node C and the time during which the signal reaches the node D is calculated, a source row number and a source column number of the signal are determined based on the time differences, and the source detector generating the signal is marked based on the two time differences.

11. The channel multiplexing method for reading a detector signal according to claim 10, wherein in the S5, a differential pulse between a pulse of the node A and a pulse of the node B and a differential pulse between a pulse of the node C and a pulse of the node D are acquired by using a subtracting circuit, a pulse width of the differential pulse between the pulse of the node A and the pulse of the node B represents the time difference between the time during which the signal reaches the node A and the time during which the signal reaches the node B, and a pulse width of the differential pulse between the pulse of the node C and the pulse of the node D represents the time difference between the time during which the signal reaches the node C and the time during which the signal reaches the node D.

12. The channel multiplexing method for reading a detector signal according to claim 10, wherein in the S5, a differential pulse between a pulse of the node A and a pulse of the node B and a differential pulse between a pulse of the node C and a pulse of the node D are acquired by using a subtracting circuit, an amplitude of the differential pulse between the pulse of the node A and the pulse of the node B represents the time difference between the time during which the signal reaches the node A and the time during which the signal reaches the node B, and an amplitude of the differential pulse between the pulse of the node C and the pulse of the node D represents the time difference between the time during which the signal reaches the node C and the time during which the signal reaches the node D.

13. The channel multiplexing method for reading a detector signal according to claim 10, wherein in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on a circuit structure and dividing lines between adjacent detectors on g(x, y) are calculated based on the circuit structure to distinguish distribution regions of different detectors on g(x, y).

14. The channel multiplexing method for reading a detector signal according to claim 10, wherein in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, positions of L detectors on g(x, y) are calculated based on the probability distribution function g(x, y) and dividing lines between adjacent detectors on g(x, y) are calculated based on the probability distribution function g(x, y) to distinguish distribution regions of different detectors on g(x, y).

15. The channel multiplexing method for reading a detector signal according to claim 10, wherein in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on a circuit structure, and a certain region around the position of the detector is served as a distribution region of the detector on g(x, y).

16. The channel multiplexing method for reading a detector signal according to claim 10, wherein in the S5, the time difference between the time during which the signal reaches the node A and the time during which the signal reaches the node B is marked as x, and the time difference between the time during which the signal reaches the node C and the time during which the signal reaches the node D is marked as y, a probability distribution function g(x, y) is calculated, a position of each of L detectors on g(x, y) is calculated based on the probability distribution function g(x, y), and a certain region around the position of the detector is served as a distribution region of the detector on g(x, y).

* * * * *